(12) United States Patent
Keller et al.

(10) Patent No.: US 8,790,760 B2
(45) Date of Patent: Jul. 29, 2014

(54) CONTAINER MADE FROM PLASTICS MATERIALS WITH A POLYMERIC ORGANOFLUORINE INTERIOR COATING FOR ACTIVE-COMPOUND FORMULATIONS FOR CROP PROTECTION OR PROTECTION OF MATERIALS

(75) Inventors: Harald Keller, Ludwigshafen (DE); Detlef Döhnert, Ludwigshafen (DE); Winfried Mayer, Bubenheim (DE); Hilar Altenhofer, Schwegenheim (DE)

(73) Assignee: BASF SE, Ludwigshafen (DE)

( * ) Notice: Subject to any disclaimer, the term of this patent is extended or adjusted under 35 U.S.C. 154(b) by 869 days.

(21) Appl. No.: 11/996,531

(22) PCT Filed: Jul. 25, 2006

(86) PCT No.: PCT/EP2006/064621
§ 371 (c)(1),
(2), (4) Date: Jan. 23, 2008

(87) PCT Pub. No.: WO2007/012640
PCT Pub. Date: Feb. 1, 2007

(65) Prior Publication Data
US 2008/0217201 A1  Sep. 11, 2008

(30) Foreign Application Priority Data

Jul. 26, 2005 (DE) .................. 10 2005 034 889

(51) Int. Cl.
*B32B 1/02* (2006.01)
*B65D 85/82* (2006.01)
*B65B 29/00* (2006.01)

(52) U.S. Cl.
USPC .................. 428/35.7; 206/524.3; 53/402

(58) Field of Classification Search
USPC ......... 429/35.7, 34.1; 206/524.3; 53/428, 402
See application file for complete search history.

(56) References Cited

U.S. PATENT DOCUMENTS

| 6,087,305 A * | 7/2000 | Kober et al. .................. 504/362 |
| 6,767,587 B1 * | 7/2004 | Brown ....................... 427/393.4 |
| 2003/0054114 A1 | 3/2003 | Huffer et al. |
| 2003/0096929 A1 * | 5/2003 | Olson et al. ................... 526/243 |

FOREIGN PATENT DOCUMENTS

| DE | 198 03 488 | 8/1999 |
| EP | 1 028 139 | 8/2000 |
| EP | 1 206 976 | 5/2002 |
| GB | 2 207 368 | 2/1989 |
| WO | WO 01/51222 | 7/2001 |
| WO | WO 01/73162 | 10/2001 |
| WO | WO 02/47829 | 6/2002 |
| WO | WO 2004/085557 | 10/2004 |

OTHER PUBLICATIONS

International Preliminary Report on Patentability for International Application No. PCT/EP2006/064621 with International filing date Jul. 25, 2006.

* cited by examiner

*Primary Examiner* — Erik Kashnikow
(74) *Attorney, Agent, or Firm* — Brinks Gilson & Lione

(57) ABSTRACT

The present invention relates to the use of containers comprising plastic materials, whose inner walls are provided with a polymeric, organofluorine coating which has a multiplicity of perfluoroalkyl groups on its surface, for active substance formulations for crop protection or material protection.

18 Claims, No Drawings

CONTAINER MADE FROM PLASTICS MATERIALS WITH A POLYMERIC ORGANOFLUORINE INTERIOR COATING FOR ACTIVE-COMPOUND FORMULATIONS FOR CROP PROTECTION OR PROTECTION OF MATERIALS

This application is a National Stage application of International Application No. PCT/EP2006/064621 filed Jul. 25, 2006, the entire contents of which is hereby incorporated herein by reference, and also claims the benefit under 35 U.S.C. §119, of DE 10 2005 034 889.0 filed Jul. 26, 2005.

The present invention relates to containers comprising plastic materials having a polymeric organofluorine inner coating for crop protection or material protection.

Formulations of active substances for crop protection or material protection, for example liquid formulations, such as aqueous or non-aqueous suspension concentrates (SC), emulsifiable concentrates (EC), suspoemulsion concentrates (SEC), solvent-containing dispersible concentrates (DC), water-soluble concentrates (SL), aqueous emulsions (EW), but also solid formulations, such as water-dispersible granules (WG) and water-soluble granules (SG), water-dispersible powders (WP) and water-soluble powders (SP), are frequently packed in containers comprising plastic materials for purposes of storage or of transport as well as for sale. The advantage of plastic containers is their comparatively high corrosion resistance, their insulating effect with respect to electrical currents and heat and their simple producibility, in addition to their low weight.

However, containers comprising plastic materials have the disadvantage that the wall materials of these containers, such as polyethylene, polyethylene terephthalate, polypropylene and polyamide, are attacked by organic solvents or constitute only an inadequate barrier to said solvents, so that any solvent constituents of the formulations can diffuse through the container walls and can be released to the environment. In addition, there is the danger that the sparingly volatile organic constituents present in the active substance formulations could penetrate (migrate) into the container wall material, which complicates the re-use and disposal of these containers. A further problem is that most active substance formulations exhibit high adhesion to the container wall materials, so that occasionally the containers cannot be completely emptied and residual amounts of active substance formulations may remain in the container and cannot be completely removed even by thorough washing. This property, too, frequently prevents re-use and increases the disposal costs.

In the meantime, plastic containers are available whose inner walls are provided with a barrier coating, e.g. of ethylene-vinyl alcohol copolymers (EVOH) and polyethylene containers produced by coextrusion with inner polyamide or EVOH layers. This inner layer is intended to reduce diffusion of volatile constituents through the plastic container walls and to make migration of organic constituents into the container wall more difficult. Examples of these are the plastic containers sold by Harcostar under the name SurfTech®.

Various proposals have been made for providing the inner walls of containers with a layer of organofluorine polymers (cf. for example WO 01/51222 and literature cited there). The organofluorine polymers used are as a rule polytetrafluoroethylene (PTFE), fluorinated ethylene-propylene copolymer (FEP), ethylene-tetrafluoroethylene copolymers (ETFE), polyvinylidene fluoride (PVDF) and perfluorinated polyethers (frequently referred to as polyperfluoroalkoxyalkanes (PFA)). However, the adhesion of active substance compositions to the container surfaces is prevented only to an insufficient extent by these coatings.

GB 2207368 proposes providing plastic containers comprising high-density polyethylene (HDPE) with a layer of organosiloxanes for improving the stability of the containers. However, these coatings reduce the adhesion of the active substance formulations to the container walls only in an insufficient manner.

EP-A 1206976 once again describes apparatuses and apparatus parts having surfaces which have a microstructure and which are rendered water-repellant, for example, with organofluorine polymers. These apparatuses and apparatus parts serve for processing, transport or storage of dispersions. Of course, these apparatus parts comprise not plastic but metal, so that the problem of the penetration of organic constituents into the container walls cannot occur. Similar apparatuses and plant parts are described in WO 01/73162.

WO 2004/085557 once again describes a method for increasing the corrosion resistance of tubes, the inner walls of the tubes being coated with at least 1 fluoropolymer. The tubes are typically those comprising an aluminum material. The use of such tubes for holding active substance formulations for crop protection or material protection is not described therein.

It is therefore the object of the present invention to provide containers comprising plastic materials for active substance formulations for crop protection or material protection, which firstly can be thoroughly emptied and from which adhering formulations can be removed easily and completely in a simple manner, for example, by washing with water. In addition, it is intended to avoid penetration of organic constituents into the plastic container walls. Moreover, the containers should be easy to produce.

This object is surprisingly achieved by containers comprising plastic materials whose inner walls are provided with a polymeric, organofluorine coating which has a multiplicity of perfluoroalkyl groups on its surface.

Accordingly, the present invention relates to containers comprising plastic materials whose inner walls are provided with a polymeric, organofluorine coating which has a multiplicity of perfluoroalkyl groups on its surface, and to the use thereof for active substance formulations for crop protection or material protection.

The coating of the inner walls with the polymeric, organofluorine coating according to the invention ensures firstly that the containers can be thoroughly emptied owing to particularly low adhesion of the active substance formulations to the container walls.

Secondly, the coating according to the invention particularly prevents effectively penetration of organic constituents into the container walls formed from plastic material and hence also the permeation of volatile, organic constituents through the container walls and their release into the environment. Moreover, the polymeric coatings according to the invention are distinguished by good adhesion to the inner walls of the container and hence by high stability. Moreover, these coatings can be applied in a simple manner to the inner walls of conventional containers comprising plastic materials without particular techniques being required.

According to the invention the polymeric, organofluorine coating of the inner walls of the container has a multiplicity of perfluoroalkyl groups on its surface. Perfluoroalkyl groups are understood as meaning linear or branched groups of the general formula $C_nF_{2n+1}$, and in particular linear groups of the formula $(CF_2)_nF$, where n is an integer, frequently a number in the range from 2 to 20, preferably a number in the range from 3 to 12, in particular a number in the range from 4 to 10 and especially a number in the range from 6 to 8. Of course, the perfluoroalkyl groups present on the surface may be identical or different with respect to n. Particularly advantageous coatings are obtained if the perfluoroalkyl groups on the surface of the polymeric, organofluorine coating according to the invention have on average 4 to 10 and especially 6 to 8 carbon atoms, i.e. n in formula A is on average in the range from 4 to 10 and especially in the range from 6 to 8. The coating according to the invention has particularly good properties if the perfluoroalkyl groups are straight-chain, i.e. linear.

Preferred perfluoroalkyl groups are frequently terminal constituents of a larger molecular unit which can be described by the general formulae a to f:

$$-(CH_2)_m-(CF_2)_nF \quad (a)$$

$$-C_6H_4-(CF_2)_kF \quad (b)$$

$$-(CF_2)_nF \quad (c)$$

$$-[OCF_2CF(CF_2)]_qF \quad (d)$$

$$-(CH_2)_m-NRSO_2(CF_2)_nF \quad (e)$$

$$-C_6H_4-[OCF_2CF(CF_2)]_qF \quad (f)$$

Therein, m is 1, 2, 3 or 4, n is from 2 to 20, preferably from 3 to 12, in particular from 4 to 10 and especially from 6 to 8, and q is from 1 to 5. R is in particular hydrogen or $C_1$-$C_4$-alkyl.

In order to obtain the desired properties of the coating, it has proven advantageous if the perfluoroalkyl groups account for at least 1% by weight, preferably at least 2% by weight, in particular at least 5% by weight and especially at least 10% by weight of the coating, i.e. based on the total amount of all coating constituents. As a rule, the proportion of perfluoroalkyl groups will not exceed 50% by weight and in particular 40% by weight, based on the total amount of all coating constituents. Accordingly, the content of organically bonded fluorine, based on the total weight of the coating, is preferably in the range from 0.5% by weight to 40% by weight, in particular in the range from 0.5% by weight to 35% by weight and particularly preferably in the range from 10% by weight to 30% by weight.

In order to obtain sufficient mechanical stability of the coating, it has proven advantageous if the thickness of the coating is at least 0.01 µm, in particular at least 0.05 µm and especially at least 0.1 µm (mean value). For cost reasons, the coating will as a rule not exceed 500 µm, preferably 200 µm and in particular 100 µm. However, thicker coatings are not disadvantageous for achieving the purpose according to the invention.

The thickness of the coating can be determined in a manner known per se by the person skilled in the art. The layer thickness can moreover be calculated or at least estimated with sufficient reliability from the amount of coating material used and the inner container area which is to be coated.

The coating according to the invention may be structured or unstructured. A structured coating may be understood as meaning a coating which has a multiplicity of elevations and indentations in the micrometer range and accordingly has a roughness of at least 0.5 µm and in particular at least 1 µm. The roughness values mentioned here relate to the root mean square of the distance of all points of the surface to the average surface.

The roughness values can be determined in a manner known per se by means of atomic force microscopy (AFM) or scanning electron microscopy (SEM). Such roughness can be achieved firstly by mechanically roughening the coating or roughening the substrate, i.e. the inner walls of the container to which the coating is applied, before application of the coating, or alternatively introducing structure-imparting constituents, for example a finely divided powder having dimensions in the micrometer range, for example having mean diameters in the range from 0.5 to 100 µm and especially in the range from 1 to 50 µm, into the coating itself. However, it has proven advantageous if the coating according to the invention has as far as possible no structuring, i.e. is as far as possible smooth. Accordingly, the roughness of the surface of the coating according to the invention is advantageously less than 0.5 µm, frequently not more than 0.4 µm and in particular not more than 0.2 µm. Accordingly, the coatings according to the invention advantageously comprise no structure-imparting constituents, such as the abovementioned powders.

The organofluorine polymer coating according to the invention may in principle have any desired structure. It may be composed of uncrosslinked film-forming polymers which have perfluoroalkyl groups, or of mixtures of these polymers with further film-forming polymers which have no perfluoroalkyl groups. It may also be composed of crosslinked polymers which have perfluoroalkyl groups, the crosslinked polymers being formed on the container wall by crosslinking of monomers carrying perfluoroalkyl groups, pre-polymers or polymers, if appropriate with addition of a crosslinking agent. Crosslinked polymer coatings are preferred since they are distinguished by particularly good adhesion to the plastic materials of the container walls.

In a preferred embodiment, the polymeric organofluorine coating comprises at least one crosslinked or uncrosslinked polymer, in particular a homo- or copolymer, having a C—C backbone which has a multiplicity of side chains (comb polymer) which in turn have perfluoroalkyl groups, for example in the form of the abovementioned groups a, b, c, d, e or f. Such polymers are obtainable by subjecting at least one ethylenically unsaturated monomer Ml which has at least one perfluoroalkyl group and, if appropriate, one or more monomers M2 which are different from the monomers Ml to homopolymerization or copolymerization.

Examples of suitable monomers Ml are the esters and the amides of monoethylenically unsaturated carboxylic acids, such as acrylic acid and methacrylic acid, with (per)fluoroalkanols of the formulae Ia to Ic or with (per)fluoroalkylamines of the formulae IIa to IId:

$$HO(CH_2)_a-(CF_2)_bF \quad (Ia)$$

$$H[OCF_2CF(CF_2)]_qF \quad (Ib)$$

$$HO(CH_2)_a-NRSO_2-(CF_2)_bF \quad (Ic)$$

$$H_2N(CH_2)_a-(CF_2)_bF \quad (IIa)$$

$$HN[(CH_2)_a-(CF_2)_bF]_2 \quad (IIb)$$

$$H_2N-C_6H_4-(CF_2)_kF \quad (IIc)$$

$$H_2N(CH_2)_r[OCF_2CF(CF_2)]_qF \quad (IId)$$

where a is 0, 1, 2, 3 or 4, b has a value from 2 to 20, preferably from 3 to 12, in particular from 4 to 10 and especially from 6 to 8, q and R have the abovementioned meanings and r is 2, 3 or 4. Examples of monomers Ml are furthermore derivatives of styrene which carry a perfluoroalkyl group or a group of the formula d on the benzene ring of the styrene. Further suitable monomers are vinyl ethers of the abovementioned alcohols Ia or Ib. The proportion of monomers M1, based on the total amount of the monomers forming the organofluorine polymer, is as a rule at least 30 mol %, preferably at least 50 mol % and in particular at least 60 mol %, e.g. from 30 to 99 mol %. The weight ratio of monomer M1 to monomer M2 is in particular in the range from 1:1 to 50:1, in particular in the range from 2:1 to 40:1 and especially in the range of 3:1 to 20:1.

Suitable comonomers are in principle all monoethylenically unsaturated monomers copolymerizable with the monomers M1. These include monoethylenically unsaturated monomers M2a which are nonpolar, in particular monoethylenically unsaturated olefins, esters of monoethylenically unsaturated $C_3$-$C_8$-monocarboxylic acids, in particular acrylic acid or methacrylic acid, with $C_1$-$C_{20}$-alkanols or with $C_5$-$C_{10}$-cycloalkanols, vinylaromatic compounds, such as styrene, vinyltoluene and α-methyl styrene and the like. These furthermore include monoethylenically unsaturated functional monomers such as monoethylenically unsaturated $C_3$-$C_8$-monocarboxylic acids and $C_4$-$C_8$-dicarboxylic acids and the anhydrides thereof, such as acrylic acid, methacrylic acid, maleic acid, fumaric acid and maleic anhydride, and furthermore hydroxyalkyl esters of the abovementioned monocarboxylic acids, such as 2-hydroxymethyl acrylate and hydroxypropyl acrylate, monoethylenically unsaturated monomers carrying amino groups, such as N-(2-aminoethyl) acrylamide or -methacrylamide, N-(3-aminopropyl)-acrylamide or -methacrylamide, 2-aminoethyl acrylate or methacrylate and 3-aminopropyl acrylate or methacrylate, and furthermore monomers carrying oxirane groups, such as glycidyl acrylate or glycidyl methacrylate (monomers M2b).

Such comb polymers having a C—C backbone and side chains carrying perfluoroalkyl groups are particularly well known from the prior art, for example from JP 09296134, JP 04120148, JP 03287615, DE 10150954, DE 10261285 and WO 2004/013225.

Suitable organofluorine polymers are furthermore polymer-analogous reaction products of copolymers of maleic acid with alcohols of the general formula Ia to Ic and/or with amines of the general formula IIa to IId. Suitable comonomers are the abovementioned monomers M1 and the abovementioned nonpolar comonomers M2a. Such copolymers are disclosed, for example in DE 10150954 and in WO97/11218.

The comb polymers can be used as such or, if they comprise a monomer having reactive functional groups incorporated in the form of polymerized units (crosslinkable comb polymer), together with a crosslinking agent which has a reactivity complementary to the reactive groups of the comb polymer and can react with these groups with bond formation. Examples of reactive groups in the comb polymer are OH, COOH and NCO groups, anhydride groups, oxirane groups or $NH_2$. According to a particularly preferred embodiment, the reactive groups are COOH and anhydride groups. Such reactive groups can be introduced into the comb polymer by suitable comonomers M2 as mentioned above during the preparation of the comb polymers.

Examples of crosslinking agents are aliphatic, cycloaliphatic and aromatic di-, tri- and polyisocyanates, e.g. tetramethylene diisocyanate, 2,3,3-trimethylhexamethylene diisocyanate, 1,4-cyclohexylene diisocyanate, phenylene 1,4-diisocyanate, toluoylene 2,4- and 2,6-diisocyanates and the isomer mixtures thereof (e.g. 80% of 2,4- and 20% of 2,6-isomers), naphthylene 1,5-diisocyanate, diphenylmethane 2,4- and 4,4'-diisocyanate, triphenylmethane 4,4',4"-triisocyanate, isocyanate prepolymers and polyisocyanates which are obtainable by an addition reaction of the abovementioned isocyanates with polyfunctional compounds containing hydroxyl or amino groups, polyisocyanates which form by biuret, allophanate or isocyanurate formation, reversibly blocked di- or polyisocyanates, compounds containing methylol groups, such as, for example, oligomers or polymers, for example low molecular weight melamine-formaldehyde resins (MF resins), such as poly(hydroxymethyl)melamine having 2, 3, 4, 5 or 6 hydroxymethyl groups, and low molecular weight melamine-formaldehyde resins (MF resins), such as poly(hydroxymethyl)melamine having 2, 3, 4, 5 or 6 hydroxymethyl groups which has been modified with a $C_1$-$C_6$-alkanol, a $C_2$-$C_6$-polyol, or an oligo-$C_2$-$C_4$-alkylene glycol (modified MF resin), urea-formaldehyde resins, cyclic urea derivatives having N-methylol groups, such as 1,3-bis(hydroxymethyl)-4,5-dihydroxyimidazolidin-2-one (DMDHEU), bis(hydroxymethyl)-4,5-dihydroxyimidazolidinone which has been modified with a $C_1$-$C_6$-alkanol, a $C_2$-$C_6$-polyol, or an oligo-$C_2$-$C_4$-alkylene glycol (modified DMDHEU or mDMDHEU), 1,3-bis(hydroxymethyl)urea, 1,3-bis(methoxymethyl)-urea; 1-hydroxymethyl-3-methylurea, 1,3-bis(hydroxymethyl)imidazolidin-2-one (dimethylolethyleneurea), 1,3-bis(hydroxymethyl)-1,3-hexahydropyrimidin-2-one (dimethylolpropyleneurea), 1,3-bis(methoxymethyl)-4,5-dihydroxyimidazolidin-2-one (DMeDHEU), tetra(hydroxymethyl)acetylenediurea, compounds carrying oxirane groups, e.g. polyglycidyl compounds, e.g. glycidyl ethers of aliphatic di- or polyols and glycidyl esters of aliphatic or aromatic carboxylic acids.

The crosslinking agent is preferably used in an amount such that firstly effective crosslinking is achieved and secondly the proportion by weight of the perfluoroalkyl groups, based on the total amount of comb polymer+crosslinking agent, is in the abovementioned ranges. Typically, the amounts of crosslinking agent are from 10 to 90% by weight, frequently from 20 to 80% by weight, in particular from 70 to 30% by weight and especially from 40 to 60% by weight, based on the total amount of comb polymer+crosslinking agent.

In a preferred embodiment of the invention, a comb polymer carrying carboxyl groups and having perfluoroalkyl groups, in particular a copolymer which comprises, as monomers M1, at least one ester of acrylic acid or of methacrylic acid with an alcohol of the formulae Ia, Ib or Ic, in particular with an alcohol of the formula Ia, and, as monomers M2, at least one monoethylenically unsaturated mono- or dicarboxylic acid, e.g. acrylic acid or methacrylic acid, and, if appropriate, one or more monomers M2 differing therefrom, is used for the production of the coating, together with a crosslinking agent. Suitable crosslinking agents are in particular crosslinking agents carrying OH groups and especially crosslinking agents carrying N-methylol groups.

The coatings are produced in a manner known per se by applying a liquid coating material which comprises the coating-forming constituents to the inner walls of the container and then solidifying the coating thus obtained, for example by drying and/or carrying out a crosslinking reaction (curing).

The polymeric, organofluorine coating according to the invention can be applied in a manner known per se to those inner walls of the plastic containers which are to be coated, for example by spraying, brushing, roll-coating, dipping and the like.

According to a first embodiment, polymers which have perfluoroalkyl groups, e.g. comb polymers, in the form of a liquid coating material, for example of a melt of these polymers, of a dilute solution or of a dispersion of these polymers in a suitable liquid dispersant or solvent are applied in the desired amount to the inner surfaces of the container which are to be coated. On solidification or on drying of the liquid coating material, a layer of the organofluorine polymer which has the desired perfluoroalkyl groups on its surface is then obtained.

According to a second, preferred embodiment of the invention, a liquid coating composition is applied to the inner walls of the plastic containers, which coating composition comprises at least one crosslinkable polymer which has perfluoroalkyl groups and at least one crosslinking agent which reacts with the crosslinkable polymer carrying perfluoro groups with bond formation and thus forms a polymeric, crosslinked coating on the inner surface of the container walls. The crosslinking can be induced photochemically or thermally.

Alternatively, it is possible to adopt a procedure in which polymerizable, low molecular weight substances, i.e. monomers or oligomers, which have perfluoroalkyl groups are applied in the form of a liquid coating material to the inner walls of the container which has to be coated and a polymerization of the low molecular weight constituents is then brought about in a manner known per se, for example photochemically or thermally or by addition of condensing agents. Here too, a crosslinked polymeric, organofluorine coating which has the desired perfluoroalkyl groups on its surface forms on the inner walls of the plastic containers.

Examples of suitable polymerizable low molecular weight substances are ethylenically unsaturated compounds which have at least one perfluoroalkyl group, for example the above-mentioned esters and amides of monoethylenically unsaturated monocarboxylic acids with the alcohols Ia, Ib or Ic or with the amides IIa, IIb, IIc or IId.

Other examples of polymerizable low molecular weight substances are siloxanes and siloxane oligomers which have free, Si-bonded OH groups and perfluoroalkyl groups, for example compounds of the formulae IIIa to IIId, mixtures thereof and oligomers thereof:

$(HO)_3Si$—R (IIIa), $(HO)_2SiR_2$ (IIIb), $(HO)_3Si$—OR (IIIa), $(HO)_2Si(OR)_2$ (IIIb), where R is a radical having at least one perfluoroalkyl group, for example a radical of the formulae a, b, c, e or f.

In this third embodiment, the coating material can, if appropriate, also comprise reactive compounds which have no organofluorine groups, so-called reactive diluents, but which react with the low molecular weight organofluorine substances with bond formation under crosslinking conditions. In the case of ethylenically unsaturated organofluorine compounds, these are, for example, so-called reactive diluents, i.e. mono- or polyethylenically unsaturated low molecular weight compounds without perfluoroalkyl groups. In the case of siloxanes, these are, for example, alkyl siloxanes, for example tetra-$C_1$-$C_4$-alkoxy silanes, such as tetraethoxysilane, tri-$C_1$-$C_4$-alkoxy-$C_1$-$C_{20}$-alkyl silanes, such as tri-ethoxyethylsilane, triethoxyoctylsilane or triethoxy-octadecylsilane, or di($C_1$-$C_4$-alkoxy)-di($C_1$-$C_{20}$-alkyl)silanes, such as dimethyldiethoxy-silane, diethyldiethoxysilane and the like.

With regard to the desired small layer thicknesses, it has proven advantageous in the case of all three embodiments to use a dilute solution or dispersion of the coating-forming constituents as coating material. The concentration of coating-forming constituents in these solutions or dispersions is as a rule in the range from 0.5 to 30% by weight, frequently in the range from 1 to 25% by weight, preferably in particular in the range from 1 to 10% by weight, particularly preferably in the range from 2 to 6% by weight.

Suitable diluents may be aqueous or non-aqueous. Examples of suitable diluents are water and mixtures of water with solvents, which are miscible with water, for example with $C_1$-$C_4$-alkanols, such as methanol, ethanol, n-propanol, isopropanol, n-butanol, isobutanol or tert-butanol, diols having 2 to 6 carbon atoms, such as glycol, propanediol, butyl glycol, diethylene glycol, dipropylene glycol, triethylene glycol, and furthermore glycerol, acetonitrile, amides and lactams, such as dimethylformamide, dimethylacetamide, N-methylpyrrolidone, lactones such as butyrolactone, ketones having 3 or 4 carbon atoms, such as acetone;

alcohols, e.g. $C_1$-$C_4$-alkanols, diols having 2 to 6 carbon atoms and glycerol;

halohydrocarbons, in particular fluorohydrocarbons and chlorofluorohydrocarbons and mixtures thereof with aliphatic, cycloaliphatic or aromatic hydrocarbons;

esters of aliphatic carboxylic acids having 1 to 6 carbon atoms with $C_1$-$C_4$-alkanols or $C_2$-$C_6$-alkane diols, such as ethyl acetate, ethyl propionate, ethyl butyrate or hydroxyethyl acetate;

ketones, such as acetone, methyl ethyl ketone, cyclohexanone and the like;

ethers, such as diethyl ether, diisopropyl ether, methyl tert-butyl ether, methyldiglycol, butyldiglycol and the like.

Preferred solvents and diluents in addition to water are solvents which are miscible with water, and mixtures of these solvents with water. Miscible with water is preferably understood as meaning those solvents which can be homogeneously mixed with water at 20° C. in an amount of at least 100 ml/l.

If appropriate, it may be necessary, after application of the organofluorine coating material, to carry out curing/crosslinking of the applied coating constituents. Depending on the chosen starting materials, the curing/crosslinking can be effected photochemically, i.e. by exposure to high-energy radiation, such as UV light or electron beams, or thermally, i.e. by application of elevated temperature, e.g. temperatures in the range from 40 to 200° C., in particular from 60 to 120° C. Of course, the conditions chosen are those under which the plastic material of the containers is not destroyed or attacked. In the case of photochemical crosslinking, photo initiators may be added to the coating material. In the case of thermally induced curing, catalysts which catalyze the crosslinking reaction, e.g. Brönstedt or Lewis acids, are frequently added. In the case of siloxane-based coatings, crosslinking is effected as a rule simply under the action of atmospheric humidity at ambient temperature.

According to the invention, the containers are those comprising plastic materials, i.e. the predominant part of the container, in particular the container walls which come into contact with the active substance formulation, are formed from plastic materials. Besides the plastic materials, the container may also comprise other materials, such as metals, for example compositions comprising metal for improving the dimensional stability and/or for protection from damage, for example compositions for reinforcing the edges, compositions for reinforcing the container in the region of orifices for filling and/or emptying the container and carrying or transport apparatuses which are connected to the container, and closure means, for example covers or screw closures comprising metal. The containers according to the invention which comprise plastic materials include those containers comprising plastic materials which are intended as inner containers for insertion into a metal container.

Depending on the design, the containers according to the invention may be dimensionally stable or flexible. In this context, dimensionally stable means that the container changes its shape only slightly during filling or under mechanical load and substantially or completely retains its original shape in the emptied or load-free state.

Flexible containers on the other hand are those containers whose shape is determined by the amount of content or by an outer container into which they are fitted. In particular, the present invention relates to the use of dimensionally stable containers comprising plastic materials and in particular those dimensionally stable containers which are substantially or exclusively composed of plastic materials.

Typical dimensionally stable containers are canisters, bottles, barrels, buckets, drums and the like.

Examples of flexible containers are foil bags, tubes, bags, including valve bags, cross bottom bags, flat bags, inliners, big bags and the like.

The abovementioned containers have as a rule at least one or two orifices for filling the container and/or for removing the active substance formulation. As a rule, these orifices are provided with conventional closure means, such as screw covers, stoppers, crown caps, faucets, dry couplings and the like. The size of the containers may vary over wide ranges and their internal volume is frequently in the range from 0.01 to 1000 l, depending on the container type. In particular, containers having internal volumes in the range from 0.1 to 100 l and especially in the range from 0.5 to 50 l are used. These containers are frequently in the form of bottles, canisters, drums and the like. Larger containers are frequently in the form of canisters, drums, big bags or inliners.

The invention relates to containers comprising plastic materials, i.e. the wall materials of the containers which come into contact with the active substance composition, consist of a plastic material customary in container construction. Examples of typical plastic materials are polyethylene, in particular high density polyethylene (HDPE), polypropylene, including syndiotactic, atactic and isotactic polypropylene, polyethylene terephthalate, and furthermore coextrudates of polyethylene or polypropylene with polyamides, coextrudates of polyethylene or polypropylene with ethylene copolymers, such as ethylene vinyl acetate copolymers, ethylene-vinyl alcohol copolymers, coextrudates of polyethylene or polypropylene with polyethylene terephthalate, polyacrylonitrile, styrene-acrylonitrile and the like. Preferred container wall materials are in particular polyethylene, polypropylene and polyethylene coextrudates, e.g. coextrudates of ethylene with polyamide or with ethylene copolymers, such as ethylene-vinyl alcohol, the polyethylene preferably forming the outside of the containers.

The thickness of the container walls does of course depend on the size or the internal volume of the containers and is typically in the range from 0.1 to 10 mm and in particular in the range from 0.5 to 5 mm (average, except for those areas in which orifices or means for transporting the containers, such as handles, are present).

The containers according to the invention are particularly suitable for holding aqueous active substance formulations, such as aqueous suspension concentrates (WSC), aqueous emulsions (EW), water-soluble concentrates (WL), aqueous suspoemulsions (SEC), and for active substance formulations which differ therefrom and are dispersible or emulsifiable in water, for example non-aqueous suspension concentrates (SC), emulsifiable concentrates (EC), solvent-containing, dispersible concentrates (DC), oil suspension concentrates, water-soluble concentrates (SL), water-dispersible granules (WG) and water-soluble granules (SG), water-dispersible powders (WP) and water-soluble powders (SP). They are suitable in particular for holding liquid formulations and especially liquid aqueous formulations.

There are no restrictions regarding the type of active substances. The active substance formulations may be formulations of herbicides, fungicides, insecticides, acaricides, nematicides, growth regulators, bactericides and other formulations as typically used in crop protection, including seed treatment, and in material protection, for example in wood protection, but also for preventive control of parasitic organisms which infest warm-blooded animals.

Typically, the active substances are organic compounds which typically have a molecular weight in the range from 150 to 1000 dalton, and in particular active substances which are insoluble or have only limited solubility in water and typically have solubility in water of less than 10 g/l, in particular less than 1 g/l (at 25° C. and 1 bar).

The formulations intended to be held in the containers according to the invention comprise as a rule the active substance or substances in total amount of from 1 to 90% by weight, frequently from 5 to 80% by weight, in particular from 10 to 70% by weight and especially from 20 to 60% by weight, based on the total weight of the formulation. In addition, the formulations also comprise as a rule surface-active substances, in particular anionic and/or nonionic surfactants, including activity-enhancing adjuvants, typically in a total amount of from 0.5 to 60% by weight, if appropriate conventional formulation additives, such as antifoams, antifreezes, thickeners, biocides in a total amount of up to 10% by weight and at least one liquid or solid carrier substance (vehicle) in an amount of typically from 15 to 75% by weight, based in each case on the total weight of the formulation. In the aqueous formulations, the carrier substance typically comprises water, if appropriate as a mixture with one or more organic solvents.

The containers according to the invention are suitable in particular for holding aqueous active substance formulations, such as aqueous suspension concentrates, aqueous suspoemulsions and aqueous emulsions, but also aqueous active substance solutions. Such formulations comprise water as a vehicle and, if appropriate, organic solvents, such as alkanols and alkanediols, and, if appropriate, the abovementioned further constituents, such as surface-active substances, including adjuvants and formulation additives.

The containers according to the invention are also particularly suitable for holding active substance formulations which comprise an organic hydrophobic solvent, i.e. those which are immiscible or have only limited miscibility with water (as a rule <50 g/l at 25° C. and 1 bar), for example aliphatic or aromatic hydrocarbons, fatty acid $C_1$-$C_{10}$-alkyl esters, in particular methyl esters, N—$C_4$-$C_{10}$-alkylpyrrolidones or mixtures thereof, in an amount of at least 1% by weight, e.g. from 1 to 90% by weight, in particular from 5 to 80% by weight. The examples of such formulations include in particular concentrates emulsifiable or dispersible in water, i.e. nonaqueous concentrates whose liquid vehicle substantially comprises organic solvents and no water or only small amounts (i.e. <1% by weight, based on the formulation) of water, but also aqueous formulations such as suspoemulsions or emulsions which, in addition to water, also comprise an organic, hydrophobic solvent, typically in an amount of from 1 to 50% by weight.

A particular advantage of the containers according to the invention is that the active substance formulations, in particular the aqueous active substance formulations, show no adhesion or only little adhesion to the container walls, and the possibility of substantial or complete emptying is therefore ensured. In addition, residual amounts of these active substance formulations which remain in the container can be very substantially or completely removed from the container in a simple manner by washing with water, without significant residual amounts of formulation or wash water remaining adhering to the container walls.

The containers according to the invention are also suitable in particular for holding active substance formulations which comprise at least one organic, nonpolar solvent, for example in an amount of at least 1% by volume, in particular at least 5% by volume. In the case of these active substance compositions, the coatings according to the invention particularly effectively prevent penetration of the solvent through the container walls and penetration of organic constituents in the container walls.

The containers according to the invention are therefore suitable in particular for the safe-keeping of active substance formulations. Here, the term safe-keeping comprises both the storage and the transport of the containers filled with the active substance formulations.

The following examples are intended to illustrate the invention, but without limiting it.

Starting Materials:

Comb polymer P1: random copolymer of methacrylic acid and a perfluoroalkyl methacrylate Ml of the formula $CH_2=C(CH_3)-COO-CH_2-CH_2-(CF_2)_6F$ having a weight ratio of methacrylic acid to Ml of 1:9 and a number average molecular weight of 3000 g/mol (gel permeation chromatography).

Melamine-formaldehyde resin: methanol-modified melamine-formaldehyde condensate having a molar melamine:formaldehyde:methanol ratio of 1:5:3

EXAMPLES

Example 1

Production of a Polyethylene Container According to the Invention 1.1 Preparation of a Coating Material 100 g of an aqueous dispersion of a comb polymer P1 having carboxyl groups and perfluoroalkyl groups, which had a solids content of 10% by weight, were mixed with 100 g of a 10% strength by weight aqueous solution of a melamine/formaldehyde resin with stirring. 0.2 g of ammonium chloride was added and stirring was effected for 10 minutes at 20° C.

1.2 Production of a Container 100 g of the coating material from 1.1 were introduced into a polyethylene bottle (volume 1 l). The bottle was closed and then shaken vigorously for 1 minute so that the coating solution was uniformly distributed over the inner wall of the bottle. Thereafter, the bottle was opened and the content was poured out and the coating material was allowed to drip out completely by holding the bottle with the orifice facing downwards. Thereafter, the bottle was dried by blowing in air and the bottle was then heated to 110° C. for 20 minutes in a through-circulation oven.

Example 2

Production of a Container from a Polyethylene/Polyamide Coextrudate

In a manner analogous to example 1, the inner surface of a plastic bottle comprising a polyethylene/polyamide coextrudate having a polyamide inner wall was coated using 100 g of the coating material from 1.1.

Example 3

Production of a Polyethylene Container According to the Invention 3.1 Preparation of a Coating Material 5 g of a water-repellant, pyrogenic silica having a BET surface area of 225 $m^2/g$ (determined according to DIN 66131, surface-treated with trimethylsilyl groups) were dispersed in 70 g of isopropanol with stirring. A solution of 20 g of the comb polymer P1 in 56 g of water and 24 g of isopropanol was added. A solution of 20 g of the melamine/formaldehyde resin in 50 g of water and 24 g of isopropanol was added to this solution. 0.2 g of ammonium chloride was added and stirring was effected for 10 minutes at 20° C.

3.2 Production of the Container

In a manner analogous to example 1.2, a polyethylene bottle having an internal volume of 1 l was coated using 100 g of the coating material from 3.1.

Example 4

Production of a Container from a Polyethylene/Polyamide Coextrudate

In a manner analogous to example 1, a plastic bottle comprising a polyethylene/polyamide coextrudate having polyamide internal walls was coated using 100 g of the coating material from 3.1.

The plastic containers of examples 1 to 4, coated according to the invention, were brought into contact with a commercially available, solvent-free aqueous suspension concentrate of chloridazon having an active substance content of about 37% by weight and a content of about 4.5% by weight of surface-active substances and small amounts of conventional formulation additives. The containers were then emptied and were suspended upside down from a recording weighing apparatus for determining the emptying behavior. The containers coated according to the invention emptied more rapidly and completely than the uncoated containers.

In the case of the container from example 4, the residual amount remaining in the container after emptying was 0.54% by weight, based on the amount required for completely filling the container. After washing with water, the adhering amount of water was about 0.25% by weight. While pouring out, it was clearly evident how the formulation film tore off from the vessel wall, whereas the inner walls of the uncoated bottles were completely wetted by the liquid film during pouring out.

We claim:

1. A container comprising,
a plastic material,
a liquid formulation comprising a crop protection substance selected from the group consisting of herbicides, fungicides, insecticides, acaricides, nematicides, growth regulators and bactericides, and a polymeric organofluorine coating, wherein said coating is present on the interior of said container and has a multiplicity of perfluoroalkyl groups on the surface of said coating, said interior comprises said inner walls, said formulation has reduced adhesion to said inner walls and said coating has a thickness from 0.01 to 500 μm, where the perfluoroalkyl groups are linear groups of the formula $(CF_2)_nF$, where n is an integer in the range from 2 to 20 and wherein said coating comprises said perfluoroalkyl groups in an amount from 1% to 50% by weight of said coating, wherein said coating comprises at least one comb polymer, wherein side chains on said comb polymer comprise said perfluoroalkyl groups wherein said comb polymer is composed of ethylenically unsaturated monomers (M), said monomers (M) comprising:

i) at least one first monoethylenically unsaturated monomer M1 which has at least one said perfluoroalkyl group, and ii) at least one second monoethylenically unsaturated monomer M2 which does not contain any said perfluoroalkyl group on said monomer M2.

2. The container of claim 1, wherein said perfluoroalkyl groups comprise four to ten carbons.

3. The container of claim 1, wherein said coating has a surface roughness of not more than 0.2 μm.

4. The container of claim 1, wherein said comb polymer is crosslinkable, and said coating further comprises a crosslinking agent.

5. The container of claim 1, wherein the wall material of said container is selected from polyethylene, polypropylene, polyethylene terephthalate and coextrudates of polyethylene or polypropylene with a polymer selected from polyamides, ethylene copolymers and polyethylene terephthalate.

6. The container of claim 1, wherein said container is dimensionally stable.

7. The container of claim 1, wherein said formulation is selected from aqueous active substance formulations and water-dispersible or water-emulsifiable active substance formulations.

8. The container of claim 1, wherein said formulation comprises at least one organic, nonpolar solvent in an amount of at least 1% by volume of said formulation.

9. The container of claim 1, wherein the container has an internal volume from 0.01 to 1000 liters.

10. The container of claim 1, wherein the container has an internal volume from 0.5 to 50 liters.

11. A method for reducing penetration of a crop protection substance, which is selected from the group consisting of herbicides, fungicides, insecticides, acaricides, nematicides, growth regulators and bactericides, into the wall of a storage and transport container-comprising:

introducing a liquid formulation comprising said crop protection substance into a container, wherein said container comprises, a plastic material, and a polymeric organofluorine coating, wherein said coating is present on the interior of said container and has a multiplicity of perfluoroalkyl groups on the surface of said coating;

wherein penetration of said crop protection substance into the walls of the container is reduced, said interior comprises said inner walls, said formulation has reduced adhesion to said inner walls and said coating has a thickness from 0.01 to 500 μm, where the perfluoroalkyl groups are linear groups of the formula $(CF_2)_nF$, where n is an integer in the range from 2 to 20 and wherein said coating comprises said perfluoroalkyl groups in an amount from 1% to 50% by weight of said coating, wherein said coating comprises at least one comb polymer, wherein side chains on said comb polymer comprise said perfluoroalkyl groups wherein said comb polymer is composed of ethylenically unsaturated monomers (M), said monomers (M) comprising:

i) at least one first monoethylenically unsaturated monomer M1 which has at least one said perfluoroalkyl group, and ii) at least one second monoethylenically unsaturated monomer M2 which does not contain any said perfluoroalkyl group on said monomer M2.

12. The method of claim 11, wherein said formulation is selected from aqueous active substance formulations and water-dispersible or water-emulsifiable active substance formulations.

13. The method of claim 11, wherein said formulation comprises at least one organic, nonpolar solvent in an amount of at least 1% by volume of said formulation.

14. The method of claim 11, wherein said comb polymer is crosslinkable, and said coating further comprises a crosslinking agent.

15. The method of claim 11, wherein the wall material of said container is selected from polyethylene, polypropylene, polyethylene terephthalate and coextrudates of polyethylene or polypropylene with a polymer selected from polyamides, ethylene copolymers and polyethylene terephthalate.

16. The method of claim 11, wherein the container has an internal volume from 0.01 to 1000 liters.

17. The method of claim 11, wherein the container has an internal volume from 0.5 to 50 liters.

18. A method for reducing the adhesion of a liquid crop protection formulation comprising a crop protection substance, which is selected from the group consisting of herbicides, fungicides, insecticides, acaricides, nematicides, growth regulators and bactericides, to the walls of a storage and transport container comprising:

introducing said crop protection formulation into a container, wherein said container comprises, a plastic material, and a polymeric organofluorine coating, wherein said coating is present on the interior of said container and has a multiplicity of perfluoroalkyl groups on the surface of said coating;

wherein the method is effective to reduce the adhesion of a crop protection formulation to the walls of the container, said interior comprises said inner walls and wherein said coating has a thickness from 0.01 to 500 μm, where the perfluoroalkyl groups are linear groups of the formula $(CF2)_nF$, where n is an integer in the range from 2 to 20 and wherein said coating comprises said perfluoroalkyl groups in an amount from 1% to 50% by weight of said coating, wherein said coating comprises at least one comb polymer, wherein said chains on said comb polymer comprise said perfluoroalkyl groups wherein said comb polymer is composed of ethylenically unsaturated monomers (M), said monomers (M) comprising:

i) at least one first monoethylenically unsaturated monomer M1 which has at least one said perfluoroalkyl group, and ii) at least one second monoethylenically unsaturated monomer M2 which does not contain any said perfluoroalkyl group on said monomer M2.

* * * * *